(12) United States Patent
Nakajima et al.

(10) Patent No.: US 10,520,316 B2
(45) Date of Patent: *Dec. 31, 2019

(54) CIRCUIT FOR PHYSICAL QUANTITY DETECTION DEVICE, PHYSICAL QUANTITY DETECTION DEVICE, ELECTRONIC APPARATUS, AND MOVING OBJECT

(71) Applicant: Seiko Epson Corporation, Tokyo (JP)

(72) Inventors: Kiminori Nakajima, Fujimi (JP); Koji Ushiyama, Chino (JP); Takashi Aoyama, Chino (JP); Koji Miyashita, Matsumoto (JP)

(73) Assignee: Seiko Epson Corporation (JP)

( * ) Notice: Subject to any disclaimer, the term of this patent is extended or adjusted under 35 U.S.C. 154(b) by 239 days.

This patent is subject to a terminal disclaimer.

(21) Appl. No.: 15/675,012

(22) Filed: Aug. 11, 2017

(65) Prior Publication Data

US 2017/0363425 A1  Dec. 21, 2017

Related U.S. Application Data

(63) Continuation of application No. 14/525,692, filed on Oct. 28, 2014, now Pat. No. 9,791,276.

(30) Foreign Application Priority Data

Oct. 30, 2013  (JP) .................................. 2013-226010

(51) Int. Cl.
*G01C 19/5776*  (2012.01)

(52) U.S. Cl.
CPC ............................... *G01C 19/5776* (2013.01)

(58) Field of Classification Search
CPC .................................................. G01C 19/5776
See application file for complete search history.

(56) References Cited

U.S. PATENT DOCUMENTS 5,160,997 A      11/1992  Sandoh et al.
2013/0199294 A1  8/2013  Townsend et al.

FOREIGN PATENT DOCUMENTS

| JP | 02-051250 A | 2/1990 |
|---|---|---|
| JP | 2002-148047 A | 5/2002 |
| JP | 2003-021516 A | 1/2003 |
| JP | 2007-187606 A | 7/2007 |
| JP | 2008-256668 A | 10/2008 |
| JP | 2012-099774 A | 5/2012 |
| JP | 2013-527455 A | 6/2013 |

*Primary Examiner* — Robert R Raevis
(74) *Attorney, Agent, or Firm* — Harness, Dickey & Pierce, P.L.C.

(57) ABSTRACT

A circuit for a physical quantity detection device includes a drive unit that generates a drive signal that causes an vibrator to vibrate, a detection unit that detects a detection signal outputted from the vibrator based on the drive signal, a passive filter which has a filter characteristic in which a cutoff frequency is lower than a detuning frequency and a cutoff frequency band contains a frequency band higher than the cutoff frequency and to which a signal from the detection unit is inputted, and an amplification unit that amplifies a signal from the passive filter.

14 Claims, 7 Drawing Sheets

CIRCUIT FOR PHYSICAL QUANTITY DETECTION DEVICE, PHYSICAL QUANTITY DETECTION DEVICE, ELECTRONIC APPARATUS, AND MOVING OBJECT

CROSS-REFERENCE TO RELATED APPLICATIONS

This application is a continuation of U.S. patent application Ser. No. 14/525,692 filed Oct. 28, 2014, which claims priority to Japanese Patent Application No. 2013-226010, filed Oct. 30, 2013, the disclosures of which are hereby expressly incorporated by reference herein in their entireties.

BACKGROUND

1. Technical Field

The present invention relates to a circuit for a physical quantity detection device, a physical quantity detection device, an electronic apparatus, and a moving object.

2. Related Art

There is a known physical quantity detection device that detects a physical quantity, such as angular velocity and acceleration, by using an vibrator, such as a quartz vibrator (piezoelectric vibrator) and an MEMS (micro electromechanical systems) vibrator.

In an angular velocity detection device, for example, in which the frequency at which an vibrator is driven and the frequency at which angular velocity is detected typically differ from each other, when a detection signal outputted from the vibrator is detected by using a drive signal, a detuning frequency component formed of a detuning frequency, which is the difference between the drive frequency and the detection frequency, is produced as an undesired wave. When the detuning frequency component increases, for example, because an impact having a large magnitude acts on the angular velocity detection device, saturation occurs in a downstream amplification circuit, resulting in an incorrect output result in some cases.

JP-A-2008-256668 discloses an angular velocity sensor including a noise remover that includes an active filter and removes a detuning frequency component from a signal having undergone synchronous detection in a synchronous detector.

In the configuration disclosed in JP-A-2008-256668, in which the active filter is provided in a position upstream of an amplifier, noise resulting from a transistor in the active filter is produced in a portion upstream of the amplifier. As a result, the noise produced in the active filter is undesirably amplified by the amplifier and outputted.

SUMMARY

An advantage of some aspects of the invention is to provide a circuit for a physical quantity detection device, a physical quantity detection device, an electronic apparatus, and a moving object capable of suppressing a detuning frequency component with noise resulting from a filter suppressed.

Application Example 1

This application example is directed to a circuit for a physical quantity detection device including a drive unit that generates a drive signal that causes an vibrator to vibrate, a detection unit that detects a detection signal outputted from the vibrator based on the drive signal, a passive filter which has a filter characteristic in which a cutoff frequency is lower than a detuning frequency and a cutoff frequency band contains a frequency band higher than the cutoff frequency and to which a signal from the detection unit is inputted, and an amplification unit that amplifies a signal from the passive filter.

According to this application example, the passive filter, which has a filter characteristic in which a cutoff frequency is lower than a detuning frequency and a cutoff frequency band contains a frequency band higher than the cutoff frequency and to which a signal from the detection unit is inputted, can suppress a detuning frequency component contained in the signal from the detection unit. Further, a passive filter does not produce noise resulting from a transistor, whereby noise resulting from the filter can be suppressed as compared with a case where an active filter is used.

Application Example 2

In the circuit for a physical quantity detection device according to the application example described above, it is preferable that the cutoff frequency is one-half the detuning frequency or lower.

According to this application example, the detuning frequency component contained in the signal outputted from the detection unit can further be suppressed.

Application Example 3

In the circuit for a physical quantity detection device according to the application example described above, it is preferable that the passive filter is a first-order CR filter.

According to this application example, the passive filter can be configured by using a simple circuit configuration.

Application Example 4

In the circuit for a physical quantity detection device according to the application example described above, it is preferable that the passive filter is a second-order or higher-order CR filter.

According to this application example, a filter characteristic that allows sharper attenuation in the frequency band higher than the cutoff frequency than the degree of attenuation provided by a first-order CR filter, whereby the detuning frequency component can be effectively suppressed.

Application Example 5

It is preferable that the circuit for a physical quantity detection device according to the application example described above further includes a filter unit that filters a signal outputted from the amplification unit.

According to this application example, the detuning frequency component can further be suppressed in a portion downstream of the amplification unit. Further, a harmonic component produced when the detection unit performs detection can be suppressed. Moreover, for example, when the filter unit is formed of a switched capacitor filter, the passive filter upstream of the amplification unit is allowed to also function as an anti-alias filter for the filter unit.

Application Example 6

It is preferable that the circuit for a physical quantity detection according to the application example device described above further includes a semiconductor substrate, a wiring line that is provided in the semiconductor substrate and electrically connects the passive filter and the amplification unit to each other, and a first shield wiring line that is so provided in the semiconductor substrate that the first shield wiring line is separated from the wiring line and juxtaposed to at least part of the wiring line in a plan view.

According to this application example, the provision of the first shield wiring line prevents extraneous noise from entering the signal inputted to the amplification unit.

Application Example 7

It is preferable that the circuit for a physical quantity detection device according to the application example described above further includes a second shield wiring line that is so provided in the semiconductor substrate that the second shield wiring line is separated from the wiring line and juxtaposed to at least part of the wiring line in a plan view, wherein the at least part of the wiring line is disposed between the first shield wiring line and the second shield wiring line in the plan view.

According to this application example, since the wiring line, which connects the passive filter and the amplification unit to each other, is provided between the first shield wiring line and the second shield wiring line, the shield wiring lines can further prevent extraneous noise from entering the signal inputted to the amplification unit.

Application Example 8

It is preferable that the circuit for a physical quantity detection device according to the application example described above further includes a third shield wiring line that is so provided in the semiconductor substrate that the third shield wiring line is separated from the wiring line and overlaps with at least part of the wiring line in a plan view.

According to this application example, the provision of the third shield wiring line can further prevent extraneous noise from entering the signal inputted to the amplification unit.

Application Example 9

It is preferable that the circuit for a physical quantity detection device according to the application example described above further includes a guard ring so provided in the semiconductor substrate that the guard ring surrounds part of a circuit accommodated in the circuit for a physical quantity detection device in a plan view, wherein at least one of the first shield wiring line, the second shield wiring line, and the third shield wiring line is electrically connected to the guard ring.

According to this application example, since at least one of the first shield wiring line, the second shield wiring line, and the third shield wiring line is electrically connected to the guard ring, which is typically electrically connected to a stable potential, the wiring line, which electrically connects the passive filter and the amplification unit to each other, can be shielded and kept at a stable potential.

Application Example 10

This application example is directed to a physical quantity detection device including any of the circuits for a physical quantity detection device according to the application examples described above and an vibrator.

According to this application example, the physical quantity detection device, which includes the circuit for a physical quantity detection device capable of suppressing a detuning frequency component with noise resulting from a filter suppressed, can be highly reliable in operation.

Application Example 11

This application example is directed to an electronic apparatus including any of the circuits for a physical quantity detection device according to the application examples described above or the physical quantity detection device according to the application example described above.

Application Example 12

This application example is directed to a moving object including any of the circuits for a physical quantity detection device according to the application examples described above or the physical quantity detection device according to the application example described above.

The electronic apparatus and the moving object according to these application examples, each of which includes the circuit for a physical quantity detection device capable of suppressing a detuning frequency component with noise resulting from a filter suppressed, can be highly reliable in operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferable example of the invention will be described below in detail with reference to the drawings. The drawings to be used are provided for ease of description. The example described below is not intended to inappropriately limit the contents of the invention set forth in the appended claims. Further, all the components described below are not necessarily essentially required in the invention.

Figure 1:
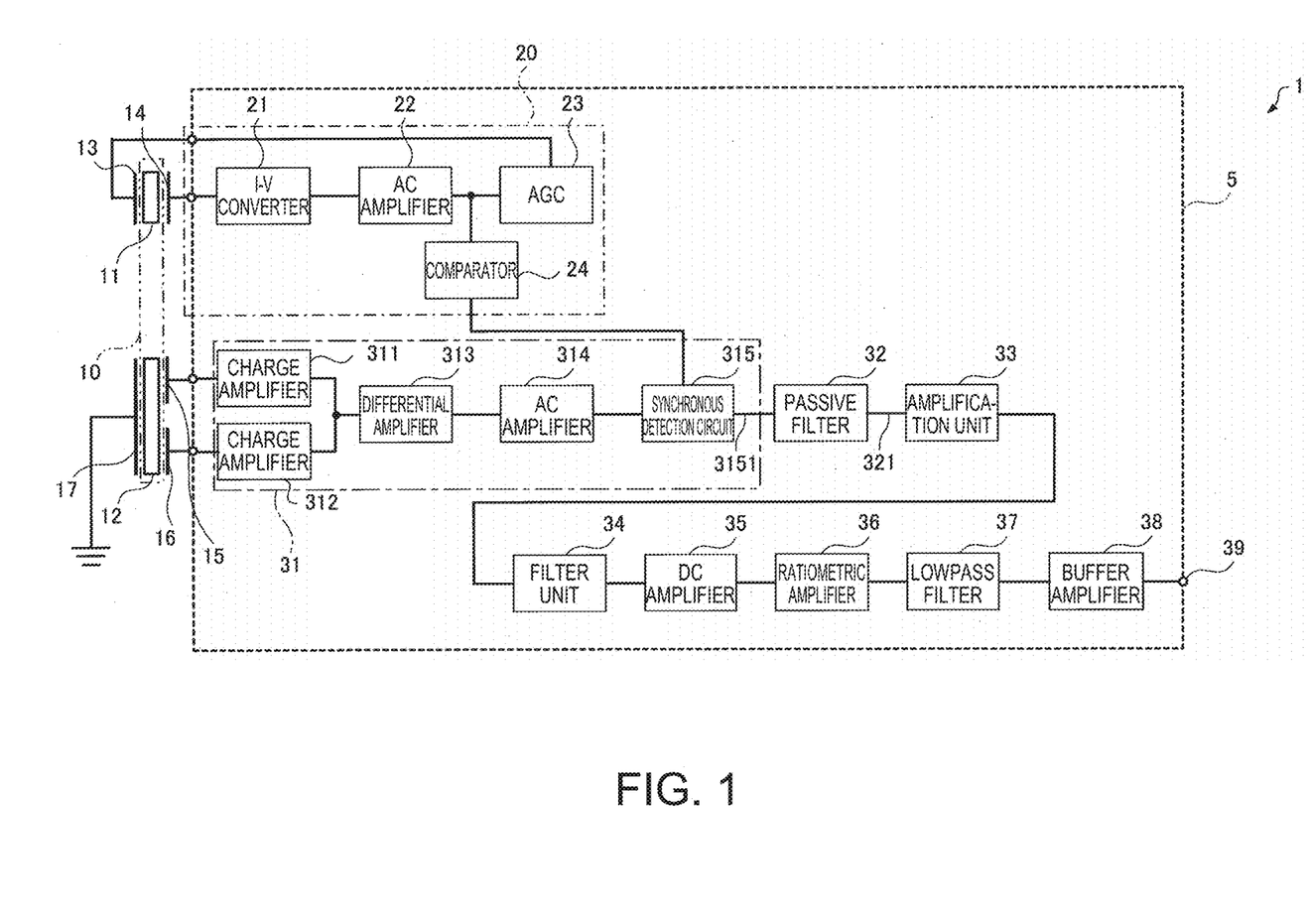
FIG. 1 is a circuit block diagram showing an example of a physical quantity detection device according to an embodiment of the invention.

1. Physical Quantity Detection Device and Circuit for Physical Quantity Detection Device FIG. 1 is a circuit block diagram showing an example of a physical quantity detection device 1 according to an embodiment of the invention. The following description will be made with reference to the physical quantity detection device 1 that detects angular velocity as an example of a physical quantity, but the physical quantity is not limited to angular velocity and may be acceleration or any one of a variety of other physical quantities.

The physical quantity detection device 1 according to the present embodiment includes an vibrator 10 and a circuit 5 for a physical quantity detection device. The circuit 5 for a physical quantity detection device may be configured as one or more semiconductor circuit devices.

1-1. Vibrator

The vibrator 10 vibrates when excited based on a drive signal inputted through a drive terminal 13 and a drive terminal 14, and the vibrator 10 receives a Coriolis force when angular velocity motion acts on the vibrator 10 in the excited vibrating state. The vibrator 10 then outputs a detection signal containing an angular velocity component based on the Coriolis force.

Figure 2:
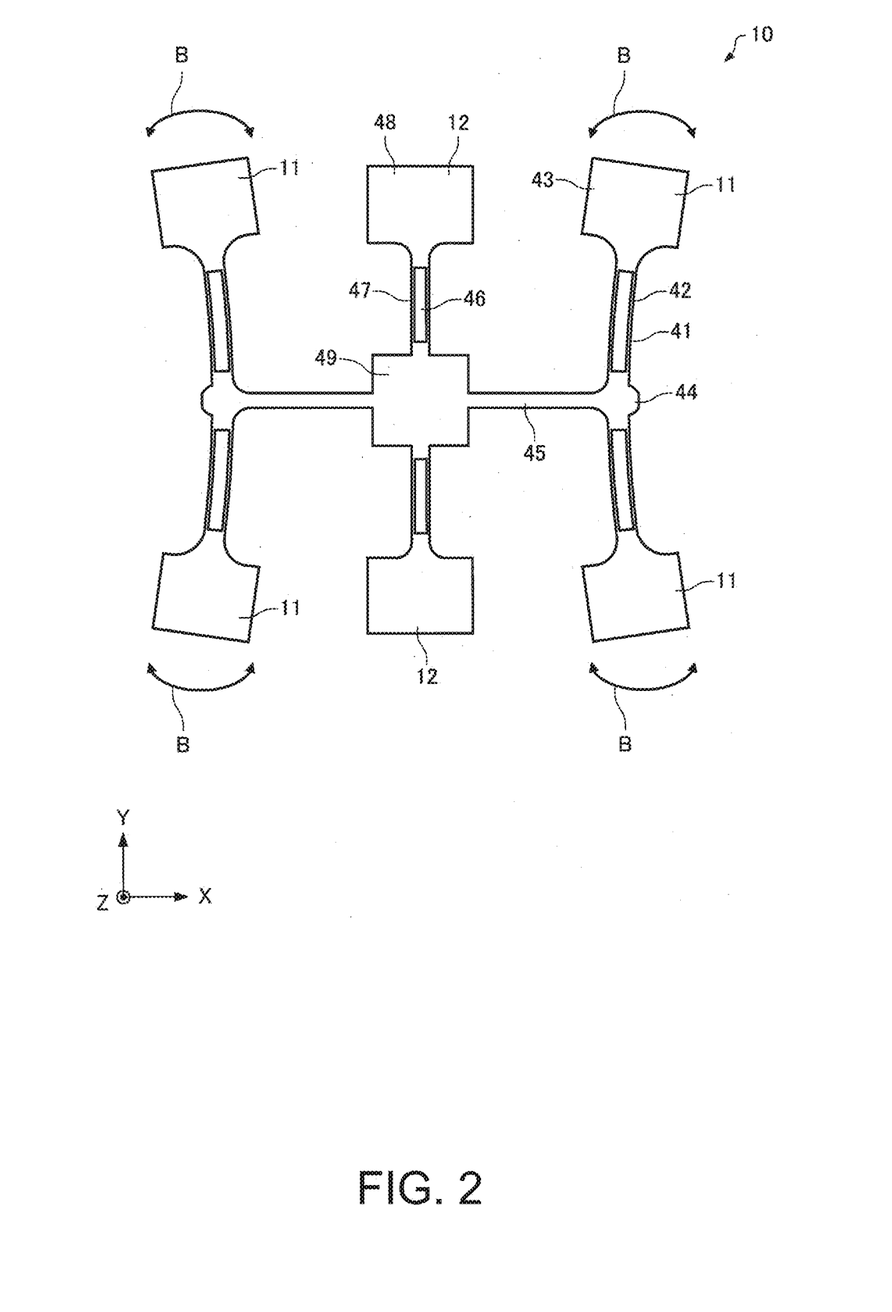
FIG. 2 is a plan view showing an example of an vibrator.
Figure 3:
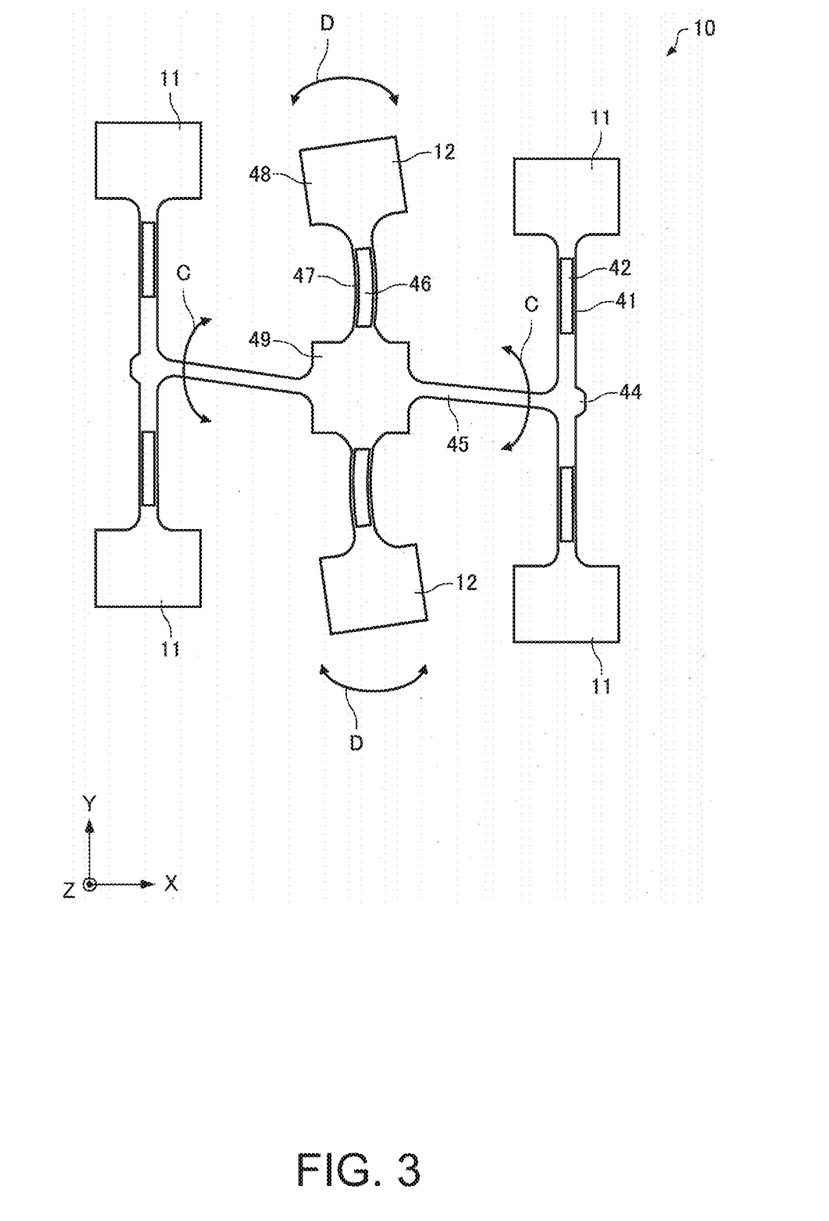
FIG. 3 is another plan view showing the example of an vibrator.

FIGS. 2 and 3 are plan views showing an example of the vibrator 10. The following description will be made with reference to a case where the vibrator 10 is formed of a thin plate made of quartz or any other piezoelectric material, but the vibrator 10 is not necessarily configured this way and may, for example, be an MEMS vibrator.

The vibrator 10 has drive bases 44, from each of which drive vibrating arms 11 (drive vibrating pieces in a broad sense) extend in a Y-axis direction of the quartz. Each of the drive bases 44 is connected to a detection base 49 via a connection arm 45, which extends in an X-axis direction of the quartz. Detection vibrating arms 12 (detection vibrating pieces in a broad sense) extend from the detection base 49 in the Y-axis direction.

Each of the detection vibrating arms 12 is provided with a detection terminal 15, a detection terminal 16, and a ground terminal 17, and the detection terminal 15 and the detection terminal 16 are connected to a detection circuit 30. The detection terminal 15 and the detection terminal 16 are configured to output detection signals having phases opposite to each other.

When a drive signal formed of an alternate voltage and an alternate current is applied between a drive electrode 41 on a side surface of each of the drive vibrating arms 11 and a drive electrode 42 on the upper surface of the drive vibrating arm 11, a resultant piezoelectric effect causes the drive vibrating arms 11 to undergo bending vibrating as indicated by the arrows B. In this state, when the vibrator 10 rotates around a Z axis of the quartz or an axis of rotation as shown in FIG. 3, the drive vibrating arms 11 receive a Coriolis force in the direction perpendicular to not only the bending vibrating direction indicated by the arrows B but also the Z axis. As a result, the connection arms 45 vibrate as indicated by the arrows C. The detection vibrating arms 12 along with the connection arms 45 then undergo bending vibrating as indicated by the arrows D in response to the vibrating of the connection arms 45 (arrows C).

An inverse piezoelectric effect produced based on the bending vibrating described above generates an alternate voltage and an alternate current between a detection electrode 47 on a side surface of each of the detection vibrating arms 12 and a detection electrode 46 on the upper surface of the detection vibrating arm 12. One of the detection electrode 47 on the side surface of the detection vibrating arm 12 and the detection electrode 46 on the upper surface thereof is connected to the ground terminal 17, and the other detection electrode is connected to the detection terminal 15 and the detection terminal 16. A detection signal containing an angular velocity component based on the Coriolis force is outputted to the detection terminal 15 and the detection terminal 16.

In the configuration shown in FIGS. 2 and 3, the detection base 49 is disposed at the center and the detection vibrating arms 12 are extended from the detection base 49 in opposite directions or in the +Y-axis and −Y-axis directions so that the vibrator 10 is balanced well. Further, the connection arms 45 are extended from the detection base 49 in opposite directions or in the +X-axis and −X-axis directions, and the drive vibrating arms 11 are extended from each of the connection arms 45 in opposite directions or in the +Y-axis and −Y-axis directions.

Further, a front end portion of each of the drive vibrating arms 11 is enlarged in the width direction thereof to form a large width portion 43, to which a weight is further added, whereby a Coriolis force having a large magnitude is produced. Moreover, the weight provides an effect of achieving a desired resonance frequency with the drive vibrating arm shortened. From the same reason, a front end portion of each of the detection vibrating arms 12 is enlarged in the width direction thereof to form a large width portion 48, to which a weight is further added.

The vibrator 10 is not necessarily configured as described above and only needs to be an vibrator that outputs a detection signal containing an angular velocity component based on a Coriolis force. For example, the vibrator 10 may have a configuration in which the drive vibrating arms also serve as the detection vibrating arms or a configuration in which a piezoelectric film is formed on each of the drive vibrating arms and the detection vibrating arms.

1-2. Circuit for Physical Quantity Detection Device

The circuit 5 for a physical quantity detection device according to the present embodiment includes a drive unit 20, which generates a drive signal that causes the vibrator 10 to vibrate, a detection unit 31, which detects a detection signal outputted from the vibrator 10 based on the drive signal, a passive filter 32, which has a filter characteristic in which a cutoff frequency fc is lower than a detuning frequency fm and the cutoff frequency band contains a frequency band higher than the cutoff frequency fc and to which a signal from the detection unit 31 is inputted, and an amplification unit 33, which amplifies a signal from the passive filter 32.

The drive unit 20 generates a drive signal that causes the vibrator 10 to vibrate. More specifically, the drive unit 20 outputs the drive signal to drive the vibrator 10 and excites the vibrator 10 to vibrate when the drive unit 20 receives a feedback signal from the vibrator 10.

The drive unit 20 in the present embodiment includes a current-voltage converter 21, an AC amplifier 22, an automatic gain control circuit 23, and a comparator 24.

When the drive vibrating arms 11 vibrate, a current based on a piezoelectric effect is outputted as a feedback signal through the drive terminal 14 and inputted to the current-voltage converter 21. The current-voltage converter 21 outputs an AC voltage signal having the same frequency as the vibrating frequency of the drive vibrating arms 11.

The AC voltage signal outputted from the current-voltage converter 21 is inputted to the AC amplifier 22. The AC amplifier 22 amplifies the inputted AC voltage signal.

The AC voltage signal outputted from the AC amplifier 22 is inputted to the automatic gain control circuit 23. The automatic gain control circuit 23 performs gain control in such a way that the amplitude of the inputted AC voltage signal is held at a fixed value and outputs the AC voltage signal having undergone the gain control to the drive terminal 13. The AC voltage signal inputted to the drive terminal 13 drives the vibrator 10.

The AC voltage signal amplified by the AC amplifier 22 is also inputted to the comparator 24, which outputs a square-wave voltage signal to the detection unit 31. The output level of the square-wave voltage signal is switched in accordance with a result of comparison between the AC voltage signal and a reference voltage signal having a central value of the amplitude of the AC voltage signal.

The detection unit 31 detects the detection signal outputted from the vibrator 10 based on the drive signal. The detection unit 31 in the present embodiment includes a charge amplifier 311, a charge amplifier 312, a differential amplifier 313, an AC amplifier 314, and a synchronous detection circuit 315.

The charge amplifier 311 and the charge amplifier 312 are connected to the detection terminal 15 and the detection terminal 16, respectively, and receive detection signals having phases opposite to each other. Signals having undergone charge-voltage conversion in the charge amplifier 311 and the charge amplifier 312 are inputted to the differential amplifier 313. The differential amplifier 313 performs differential amplification in which (output signal from charge amplifier 311)—(output signal from charge amplifier 312) is amplified. The output signal from the differential amplifier 313 is further amplified by the AC amplifier 314. The amplification in each of the charge amplifier 311 and the charge amplifier 312 advances the phase of the signal outputted therefrom by 90 degrees.

The synchronous detection circuit 315 performs synchronous detection of the output signal from the AC amplifier 314 based on the square-wave voltage signal outputted from the comparator 24 to extract the angular velocity component contained in the detection signal. Now, let f1 be the resonance frequency of the drive vibrating arms 11 and f2 be the resonance frequency of the detection vibrating arms 12. The output signal from the synchronous detection circuit 315 particularly contains a (f2-f1) frequency (detuning frequency fm) component as a detuning frequency component (noise component).

The passive filter 32 filters the signal outputted from the detection unit 31. The passive filter 32 has a filter characteristic in which the cutoff frequency fc is lower than the detuning frequency fm and the cutoff frequency band contains a frequency band higher than the cutoff frequency fc. The passive filter 32 can, for example, be a lowpass filter or a band elimination filter. In the present embodiment, the passive filter 32 is a lowpass filter. The passive filter 32 may have a function of removing a harmonic component produced when the synchronous detection circuit 315 performs detection.

The amplification unit 33 amplifies the signal outputted from the passive filter 32. The amplification unit 33 may be an amplifier capable of controlling the amplification factor thereof. The detection sensitivity of the physical quantity detection device 1 can thus be adjusted.

According to the present embodiment, the passive filter 32, which has a filter characteristic in which the cutoff frequency fc is lower than the detuning frequency fm and the cutoff frequency band contains a frequency band higher than the cutoff frequency fc and to which the signal from the detection unit 31 is inputted, can suppress the detuning frequency component contained in the signal from the detection unit 31. Therefore, when the detuning frequency component increases due, for example, to an impact having a large magnitude and acting on the physical quantity detection device 1, a risk of saturation in the amplification unit 33 can be lowered, whereby the physical quantity detection device 1 can be highly reliable. Further, the passive filter 32 does not produce noise resulting from a transistor, whereby noise resulting from the filter can be suppressed as compared with a case where an active filter is used.

The cutoff frequency fc of the passive filter 32 may be one-half the detuning frequency fm or lower.

According to the present embodiment, the detuning frequency component contained in the signal outputted from the detection unit 31 can further be suppressed.

For example, when the detuning frequency fm is 600 Hz and the passive filter 32 is formed of a first-order CR filter (lowpass filter), comparison based on a numerical simulation of the output from the amplification unit 33 between a case where the cutoff frequency fc of the passive filter 32 is set at 277 Hz (Example) and a case where the cutoff frequency fc is set at 3 kHz (Comparative Example) ascertains that the amount of detuning frequency component contained in the output in Example is about 0.41 times the amount of contained detuning frequency component in Comparative Example.

Figure 4A:
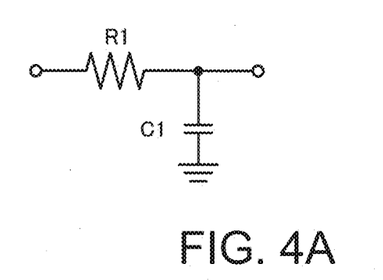
FIGS. 4A and 4B are circuit diagrams showing examples of the configuration of a passive filter.
Figure 4B:
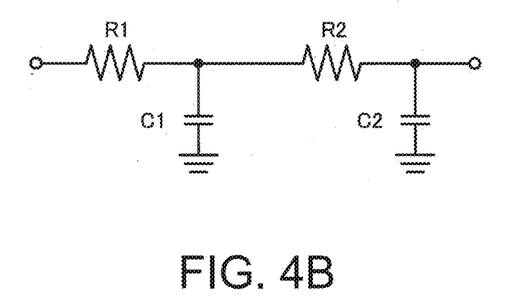

FIGS. 4A and 4B are circuit diagrams showing examples of the configuration of the passive filter 32.

The passive filter 32 may be a first-order CR filter. In the example shown in FIG. 4A, the passive filter 32 is formed of a first-order lowpass filter including a resistor R1 and a capacitor C1. According to the present embodiment, the passive filter 32 can be configured by using a simple circuit configuration.

The passive filter 32 may be a second-order or higher-order CR filter. In the example shown in FIG. 4B, the passive filter 32 is formed of a second-order lowpass filter including a resistor R1, a resistor R2, a capacitor C1, and a capacitor C2. According to the present embodiment, a filter characteristic that allows sharper attenuation in the frequency band higher than the cutoff frequency fc than the degree of attenuation provided by the first-order CR filter, whereby the detuning frequency component can be effectively suppressed.

The circuit 5 for a physical quantity detection device according to the present embodiment may further include a filter unit 34, which filters the signal outputted from the amplification unit 33. The filter unit 34 may, for example, be a lowpass filter or a band elimination filter. The filter unit 34 may instead be formed of an active filter, such as a switched capacitor filter. The filter unit 34 may have a filter characteristic that allows suppression of the detuning frequency component. The filter unit 34 may also have a filter characteristic that allows suppression of a harmonic component produced when the synchronous detection circuit 315 performs detection.

According to the present embodiment, the detuning frequency component can further be suppressed in a portion downstream of the amplification unit 33. Further, a harmonic component produced when the detection unit 31 performs detection can be suppressed. Moreover, for example, when the filter unit 34 is formed of a switched capacitor filter, the passive filter 32 upstream of the amplification unit 33 is allowed to also function as an anti-alias filter for the filter unit 34.

The circuit 5 for a physical quantity detection device according to the present embodiment may further include a DC amplifier 35, a ratiometric amplifier 36, a lowpass filter 37, a buffer amplifier 38, and an output terminal 39.

The DC amplifier 35 amplifies the output signal from the filter unit 34. The DC amplifier 35 may be an amplifier capable of controlling the amplification factor thereof. The detection sensitivity of the physical quantity detection device 1 can thus be adjusted.

The ratiometric amplifier 36 amplifies the output signal from the DC amplifier 35. The ratiometric amplifier 36 is configured to have a ratiometric characteristic that allows the amplification factor of the ratiometric amplifier 36 to be changed in response to a change in power supply voltage.

The lowpass filter 37 filters the output signal from the ratiometric amplifier 36. The lowpass filter 37 may have a filter characteristic that allows suppression of the detuning frequency component. Further, the lowpass filter 37 may have a filter characteristic that allows suppression of a harmonic component produced when the synchronous detection circuit 315 performs detection.

The buffer amplifier 38 causes the output signal from the lowpass filter 37 to undergo impedance conversion and outputs the converted signal to the output terminal 39.

Figure 5A:
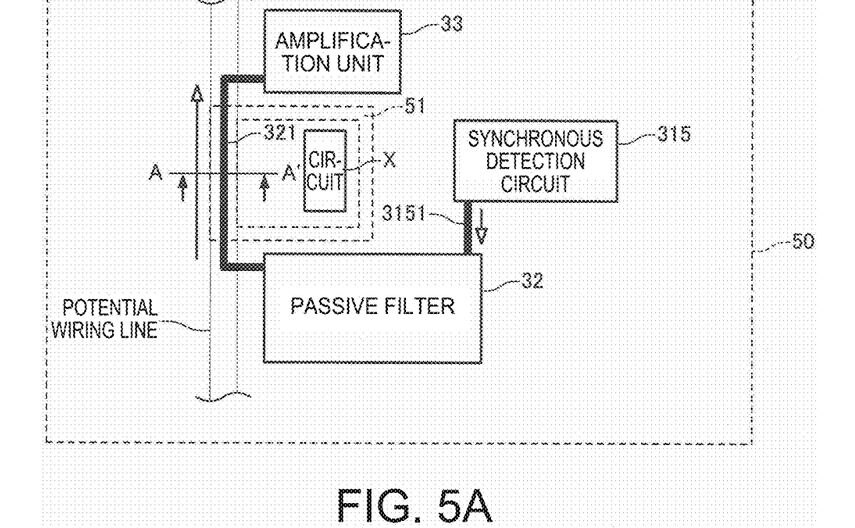
FIG. 5A is a plan view diagrammatically showing part of a circuit for a physical quantity detection device according to the present embodiment.
Figure 5B:
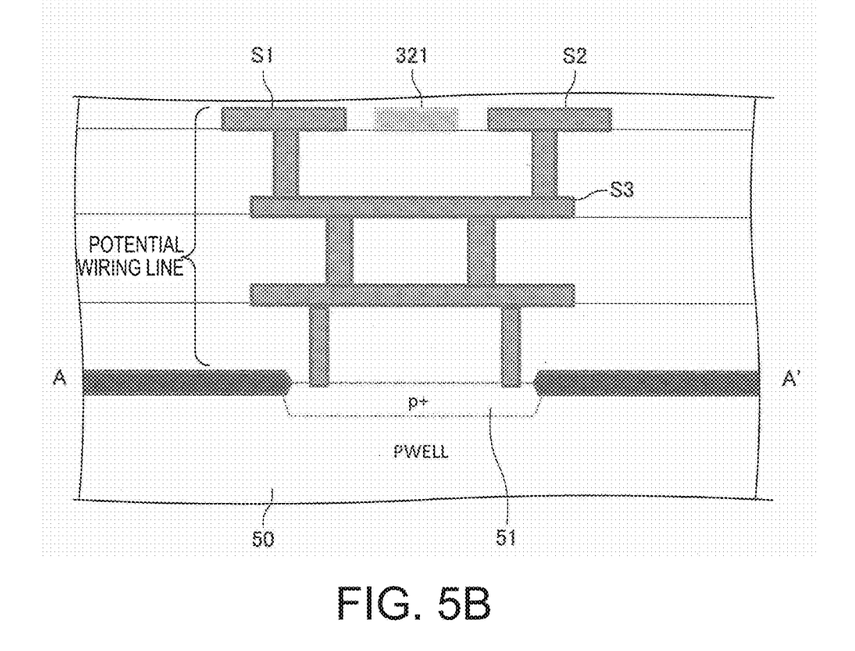
FIG. 5B is a diagrammatic enlarged cross-sectional view taken along the line A-A' in FIG. 5A.

FIG. 5A is a plan view diagrammatically showing part of the circuit 5 for a physical quantity detection device according to the present embodiment. FIG. 5B is a diagrammatic enlarged cross-sectional view taken along the line A-A' in FIG. 5A.

The circuit 5 for a physical quantity detection device according to the present embodiment may further include a semiconductor substrate 50, a wiring line 321, which is provided in the semiconductor substrate 50 and electrically connects the passive filter 32 and the amplification unit 33 to each other, and a first shield wiring line S1, which is so provided in the semiconductor substrate 50 that the first shield wiring line S1 is separated from the wiring line 321 but juxtaposed to at least part of the wiring line 321 in a plan view.

In the example shown in FIG. 5A, the synchronous detection circuit 315, the passive filter 32, and the amplification unit 33 are provided in the semiconductor substrate 50. A wiring line 3151, which electrically connects the synchronous detection circuit 315 and the passive filter 32 to each other, and the wiring line 321, which electrically connects the passive filter 32 and the amplification unit 33 to each other, are provided in the semiconductor substrate 50. Further, a potential wiring line to which a ground potential, a power supply potential, or any other stable potential is supplied is provided in the semiconductor substrate 50. The open arrows in FIG. 5A indicate the flow of a signal. In the present embodiment, a ground potential is supplied to the potential wiring line.

In the example shown in FIG. 5B, the potential wiring line is formed of metal wiring lines in three layers with an interlayer insulating film therebetween and via conductors that electrically connect the wiring lines in wiring layers adjacent to each other.

The first shield wiring line S1 is so disposed that it is separated and insulated from the wiring line 321. The first shield wiring line S1 is further so disposed that it is juxtaposed to at least part of the wiring line 321 in a plan view. In the example shown in FIG. 5B, the first shield wiring line S1 is disposed in the wiring layer where the wiring line 321 is disposed.

According to the present embodiment, the provision of the first shield wiring line S1 prevents extraneous noise from entering the signal inputted to the amplification unit 33. A risk of saturation in the amplification unit 33 due to extraneous noise can therefore be lowered, whereby the physical quantity detection device 1 can be highly reliable.

The circuit 5 for a physical quantity detection device according to the present embodiment may further include a second shield wiring line S2, which is so provided in the semiconductor substrate 50 that the second shield wiring line S2 is separated from the wiring line 321 but juxtaposed to at least part of the wiring line 321 in a plan view, and at least part of the wiring line 321 may be disposed between the first shield wiring line S1 and the second shield wiring line S2 in the plan view.

The second shield wiring line S2 is so disposed that it is separated and insulated from the wiring line 321. The second shield wiring line S2 is further so disposed that it is juxtaposed to at least part of the wiring line 321 in a plan view. In the example shown in FIG. 5B, the second shield wiring line S2 is disposed in the wiring layer where the wiring line 321 and the first shield wiring line S1 are disposed.

According to the present embodiment, since the wiring line 321, which connects the passive filter 32 and the amplification unit 33 to each other, is provided between the first shield wiring line S1 and the second shield wiring line S2, the shield wiring lines can further prevent extraneous noise from entering the signal inputted to the amplification unit 33. A risk of saturation in the amplification unit 33 due to extraneous noise can therefore be lowered, whereby the physical quantity detection device 1 can be highly reliable.

The circuit 5 for a physical quantity detection device according to the present embodiment may further include a third shield wiring line S3, which is so provided in the semiconductor substrate 50 that the third shield wiring line S3 is separate from the wiring line 321 but overlaps with at least part of the wiring line 321 in a plan view.

The third shield wiring line S3 is so disposed that it is separated and insulated from the wiring line 321. The third shield wiring line S3 is further so disposed that it overlaps with at least part of the wiring line 321 in a plan view. In the example shown in FIG. 5B, the third shield wiring line S3 is disposed in a wiring layer separate from the wiring line 321 toward the semiconductor substrate 50, but the two wiring lines are not necessarily disposed as described above and the wiring line 321 may be disposed in a wiring layer separate from the third shield wiring line S3 toward the semiconductor substrate 50.

According to the present embodiment, the provision of the third shield wiring line S3 can further prevent extraneous noise from entering the signal inputted to the amplification unit 33. A risk of saturation in the amplification unit 33 due to extraneous noise can therefore be lowered, whereby the physical quantity detection device 1 can be highly reliable.

The circuit 5 for a physical quantity detection device may further include a guard ring 51, which is so provided in the semiconductor substrate 50 that the guard ring 51 surrounds part of a circuit (circuit X) accommodated in the circuit 5 for a physical quantity detection device in a plan view, and at least one of the first shield wiring line S1, the second shield wiring line S2, and the third shield wiring line S3 may be electrically connected to the guard ring 51. In the example shown in FIG. 5B, the first shield wiring line S1, the second shield wiring line S2, and the third shield wiring line S3 are electrically connected to each other and each electrically connected to the guard ring 51.

According to the present embodiment, since at least one of the first shield wiring line S1, the second shield wiring line S2, and the third shield wiring line S3 is electrically connected to the guard ring 51, which is typically electrically connected to a stable potential, the wiring line 321, which electrically connects the passive filter 32 and the amplification unit 33 to each other, can be shielded and kept at a stable potential.

2. Electronic Apparatus

Figure 6:
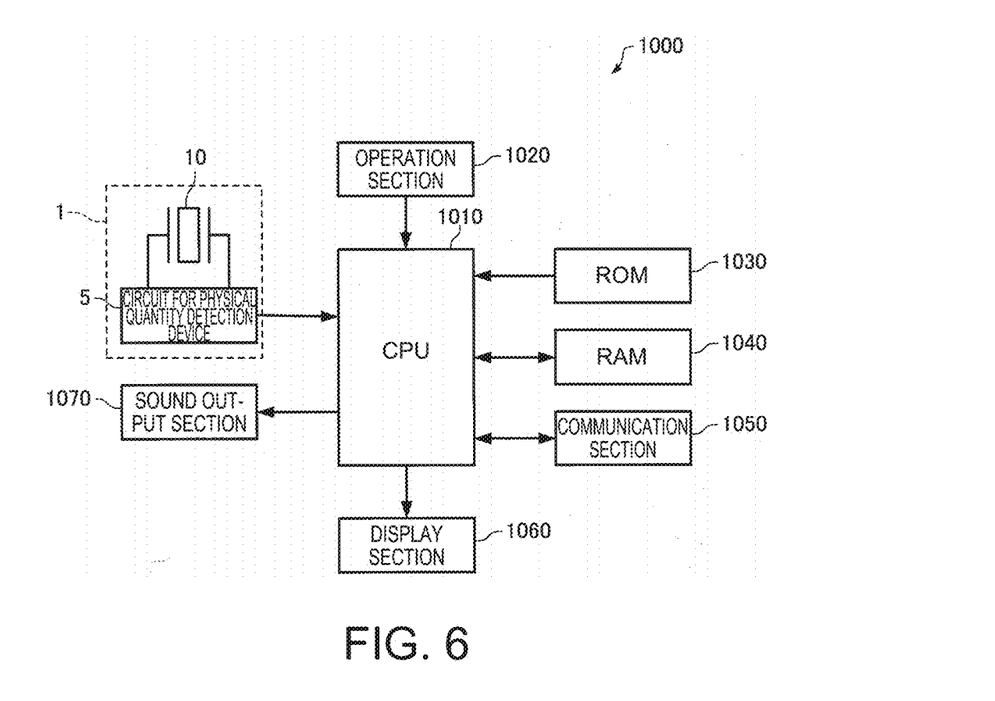
FIG. 6 is a functional block diagram of an electronic apparatus according to the present embodiment.

FIG. 6 is a functional block diagram of an electronic apparatus 1000 according to the present embodiment. The same components as those in the embodiment described above have the same reference symbols and will not be described in detail.

The electronic apparatus 1000 according to the present embodiment includes the circuit 5 for a physical quantity detection device or the physical quantity detection device 1. In the example shown in FIG. 6, the electronic apparatus 1000 includes the physical quantity detection device 1, which includes the vibrator 10 and the circuit 5 for a physical quantity detection device, a CPU (central processing unit) 1010, an operation section 1020, a ROM (read only memory) 1030, a RAM (random access memory) 1040, a communication section 1050, a display section 1060, and a sound output section 1070. In the electronic apparatus 1000 according to the present embodiment, part of the components (portions described above) shown in FIG. 6 may be omitted or changed, or other components may be added.

The CPU 1010 carries out a variety of calculation processes and control processes in accordance with a program stored, for example, in the ROM 1030. Specifically, the CPU 1010 carries out a computation process based on an output signal from the physical quantity detection device 1, a variety of processes according to operation signals from the operation section 1020, a process of controlling the communication section 1050 for data communication with an external apparatus, a process of transmitting a display signal that causes the display section 1060 to display a variety of types of information, a process of causing the sound output section 1070 to output a variety of sounds, and other processes.

The operation section 1020 is an input device formed, for example, of operation keys and button switches and outputs an operation signal according to user's operation to the CPU 1010.

The ROM 1030 stores programs, data, and other types of information in accordance with which the CPU 1010 carries out the variety of calculation processes and control processes.

The RAM 1040 is used as a work area for the CPU 1010 and temporarily stores programs and data read from the ROM 1030, data inputted through the operation section 1020, results of computation executed by the CPU 1010 in accordance with a variety of programs, and other data.

The communication section 1050 performs a variety of types of control for establishing data communication between the CPU 1010 and an external apparatus.

The display section 1060 is a display device formed of an LCD (liquid crystal display), an electrophoretic display, or any other type of display and displays a variety of types of information based on the display signal inputted from the CPU 1010.

The sound output section 1070 is a loudspeaker or any other device that outputs sounds.

The electronic apparatus 1000 according to the present embodiment, which includes the circuit 5 for a physical quantity detection device capable of suppressing a detuning frequency component with noise resulting from a filter suppressed, can be highly reliable in operation.

The electronic apparatus 1000 may conceivably be any of a variety of electronic apparatus, for example, a personal computer (such as mobile personal computer, laptop personal computer, and tablet personal computer), a mobile phone or any other mobile terminal, a digital still camera, an inkjet-type liquid ejection apparatus (such as inkjet printer), a router, a switch, or any other storage area network device, a local area network device, a device for a mobile terminal base station, a television receiver, a video camcorder, a video recorder, a car navigation system, a pager, an electronic notebook (including electronic notebook having communication capability), an electronic dictionary, a desktop calculator, an electronic game console, a game controller, a word processor, a workstation, a TV phone, a security television monitor, electronic binoculars, a POS (point of sale) terminal, medical apparatus (such as electronic thermometer, blood pressure gauge, blood sugar meter, electrocardiograph, ultrasonic diagnostic apparatus, and electronic endoscope), a fish finder, a variety of measuring apparatus, a variety of instruments (such as instruments in vehicles, airplanes, and ships), a flight simulator, a head-mounted display, a motion tracer, a motion tracker, a motion controller, and a PDR (pedestrian dead reckoning) device.

Figure 7:
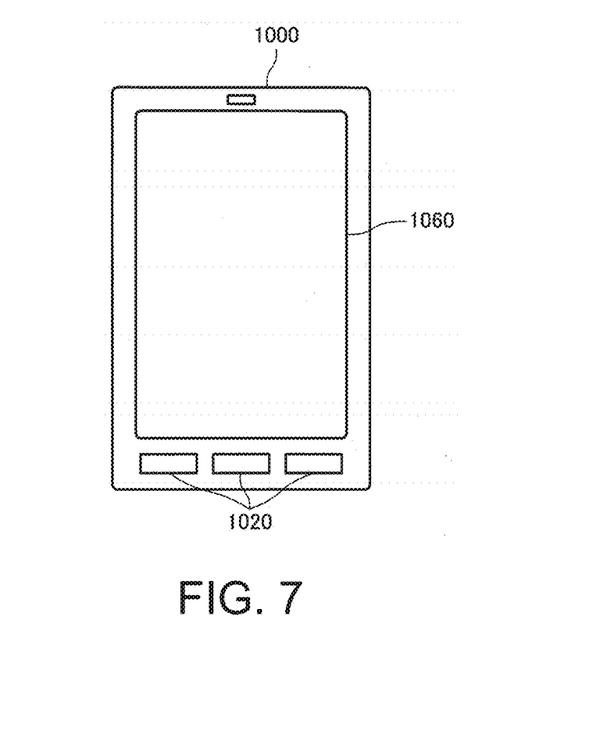
FIG. 7 shows an example of the exterior appearance of a smartphone as an example of the electronic apparatus.

FIG. 7 shows an example of the exterior appearance of a smartphone as an example of the electronic apparatus 1000. The smartphone as the electronic apparatus 1000 includes buttons as the operation section 1020 and an LCD as the display section 1060. The smartphone, which is the electronic apparatus 1000 and includes the circuit 5 for a physical quantity detection device capable suppressing a detuning frequency component with noise resulting from a filter suppressed, can be highly reliable.

3. Moving Object

Figure 8:
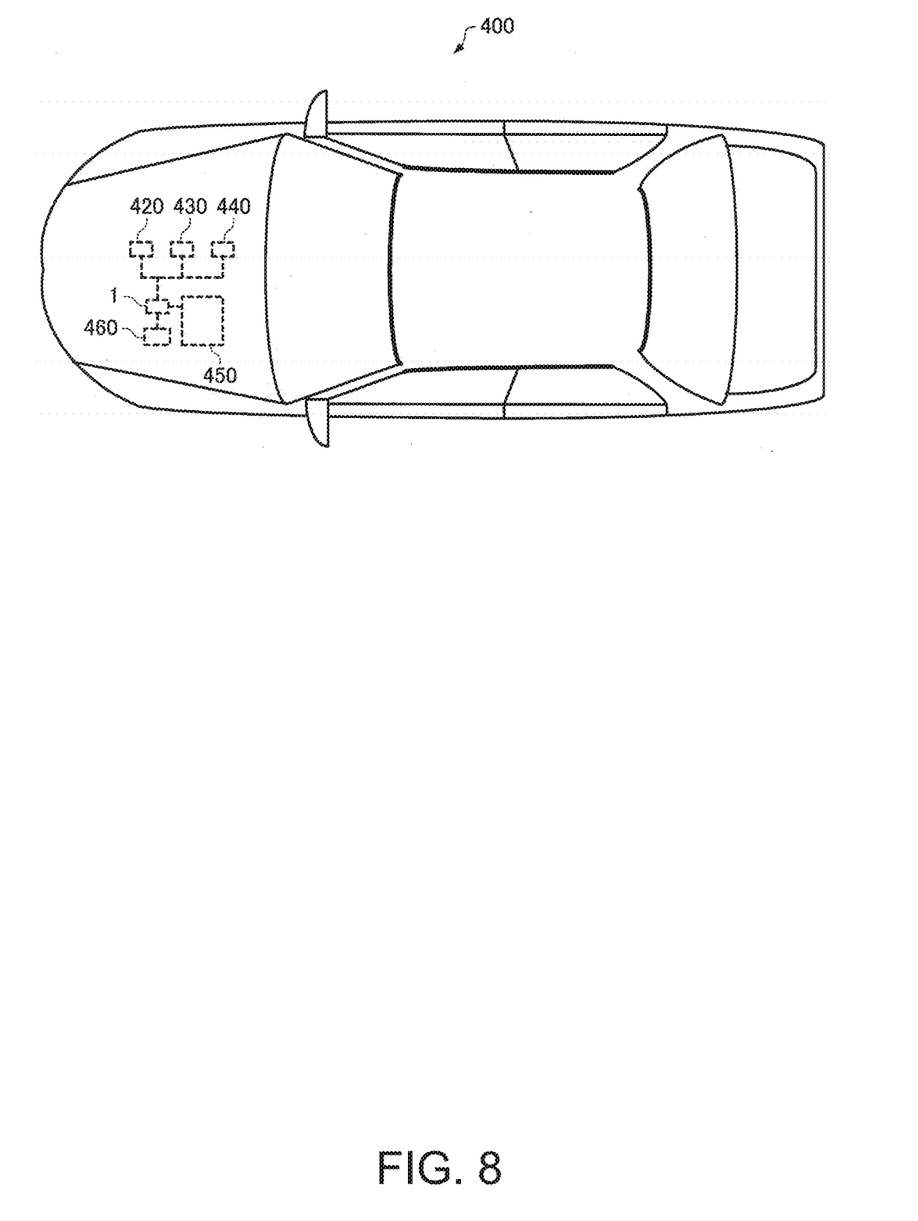
FIG. 8 shows (is a top view showing) an example of a moving object according to the present embodiment.

FIG. 8 shows (is a top view showing) an example of a moving object 400 according to the present embodiment. The same components as those in the embodiment described above have the same reference symbols and will not be described in detail.

The moving object 400 according to the present embodiment includes the circuit 5 for a physical quantity detection device or the physical quantity detection device 1. FIG. 8 shows the moving object 400 including the physical quantity detection device 1. In the example shown in FIG. 8, the moving object 400 includes a controller 420, a controller 430, and a controller 440, which perform a variety of types of control, for example, on an engine system, a brake system, and a keyless entry system, a battery 450, and a backup battery 460. In the moving object 400 according to the present embodiment, part of the components (portions described above) shown in FIG. 8 may be omitted or changed, or other components may be added.

The moving object 400 according to the present embodiment, which includes the circuit 5 for a physical quantity detection device capable suppressing a detuning frequency component with noise resulting from a filter suppressed, can be highly reliable in operation.

The moving object 400 may conceivably be any of a variety of moving objects, for example, an automobile (including electric automobile), a jet airplane, a helicopter, and other aircraft, a ship, a rocket, and an artificial satellite.

The present embodiment or the variations have been described above. The invention is not limited to the present embodiment or the variations and can be implemented in a variety of aspects to the extent that they do not depart from the substance of the invention.

The scope of the invention encompasses substantially the same configurations as the configuration described in the embodiment (for example, a configuration having the same function, using the same method, and providing the same result or a configuration having the same purpose and providing the same effect). Further, the scope of the invention encompasses a configuration in which an inessential portion of the configuration described in the embodiment is replaced. Moreover, the scope of the invention encompasses a configuration that provides the same advantageous effect as that provided by the configuration described in the embodiment or a configuration that can achieve the same purpose as that achieved by the configuration described in the embodiment. Further, the scope of the invention encompasses a configuration in which a known technology is added to the configuration described in the embodiment.

What is claimed is:

1. A circuit for a physical quantity detection device, the circuit comprising:
    a semiconductor substrate;
    a drive unit that generates a drive signal, the drive signal causing a vibrator to vibrate;
    a detection unit that detects a detection signal outputted from the vibrator based on the drive signal;
    a passive filter which has a filter characteristic in which a cutoff frequency is lower than a detuning frequency and in which a cutoff frequency band contains a frequency band higher than the cutoff frequency, a signal from the detection unit being inputted to the passive filter;
    a wiring line that is provided in the semiconductor substrate and is electrically connected to the passive filter; and
    a first shield wiring line that is provided in the semiconductor substrate so that the first shield wiring line is separated from the wiring line and juxtaposed to at least part of the wiring line in a portion downstream of the passive filter in a plan view.

2. The circuit for a physical quantity detection device according to claim 1,
    wherein the first shield wiring line is a potential wiring line to which a ground potential, a power supply potential, or any other stable potential is supplied.

3. The circuit for a physical quantity detection device according to claim 1, further comprising
    a second shield wiring line that is provided in the semiconductor substrate so that the second shield wiring line is separated from the wiring line and juxtaposed to at least part of the wiring line in the plan view,
    wherein the at least part of the wiring line is disposed between the first shield wiring line and the second shield wiring line in the plan view.

4. The circuit for a physical quantity detection device according to claim 3, further comprising
    a third shield wiring line that is provided in the semiconductor substrate so that the third shield wiring line is separated from the wiring line and overlaps with at least part of the wiring line in the plan view.

5. The circuit for a physical quantity detection device according to claim 4,
    wherein the first shield wiring line, the second shield wiring line, and the third shield wiring line are electrically connected to each other.

6. The circuit for a physical quantity detection device according to claim 4, further comprising
    a guard ring that is provided in the semiconductor substrate so that the guard ring surrounds an inner part of the circuit for a physical quantity detection device in the plan view,
    wherein at least one of the first shield wiring line, the second shield wiring line, and the third shield wiring line is electrically connected to the guard ring.

7. The circuit for a physical quantity detection device according to claim 1, further comprising
    a second shield wiring line that is provided in the semiconductor substrate so that the second shield wiring line is separated from the wiring line and overlaps with at least part of the wiring line in the plan view.

8. The circuit for a physical quantity detection device according to claim 1, further comprising
    an amplification unit,
    wherein the wiring line electrically connects the passive filter and the amplification unit.

9. The circuit for a physical quantity detection device according to claim 8, further comprising
    a filter unit that filters a signal outputted from the amplification unit.

10. The circuit for a physical quantity detection device according to claim 1,
    wherein the passive filter is a first-order CR filter.

11. The circuit for a physical quantity detection device according to claim 1,
    wherein the passive filter is a second-order or higher-order CR filter.

12. A physical quantity detection device comprising:
    the circuit for a physical quantity detection device according to claim 1; and
    the vibrator.

13. An electronic apparatus comprising the circuit for a physical quantity detection device according to claim 1.

14. A moving object comprising the circuit for a physical quantity detection device according to claim 1.

* * * * *